Nov. 7, 1961  C. G. MARTIN ET AL  3,007,306
VAPOR CYCLE ENGINE
Filed June 17, 1958  3 Sheets-Sheet 1

Inventors
CECIL G. MARTIN
ROBERT J. DENINGTON

Nov. 7, 1961    C. G. MARTIN ET AL    3,007,306
VAPOR CYCLE ENGINE
Filed June 17, 1958    3 Sheets-Sheet 3

Inventors
CECIL G. MARTIN
ROBERT J. DENINGTON

By Hill, Sherman, Meroni, Gross & Simpson    Attys.

United States Patent Office 3,007,306
Patented Nov. 7, 1961

3,007,306
VAPOR CYCLE ENGINE
Cecil G. Martin, Cleveland, and Robert J. Denington, Chesterland, Ohio, assignors to Thompson Ramo Wooldridge Inc., a corporation of Ohio
Filed June 17, 1958, Ser. No. 742,693
2 Claims. (Cl. 60—38)

The present invention relates to improvements in power plant systems operating under a Rankine cycle. More particularly, the invention relates to improvements in Rankine cycle power plants having a closed system for the operating fluid and adapted to particularly advantageous use with a mercury vapor cycle.

Rankine cycle engines offer advantages in various circumstances, and are advantageous in that there are few silencing problems. The internal combustion engine has an inherently high noise level and where silencing is necessary, the weight of silencing equipment becomes prohibitive. Silencing the exhaust from a Rankine cycle power plant and especially a turbine power plant is a problem which can be solved.

A feature of the present invention is the presentation of a system which has increased operational advantages, increased efficiency, and reduced weight and is capable of use with various heat sources such as nuclear reactors or chemical fueled combustors which may be used in aircraft and rocket power units. Although the invention offers advantages with various types of working fluids, it is especially adapted to use with a mercury vapor cycle. The advantages of mercury, as compared with water, for example, are numerous. Much higher cycle efficiencies are obtainable with the mercury cycle. Further, if weight and size of equipment is a problem, the mercury cycle can still obtain the same cycle efficiencies as the steam cycle by using a much smaller condenser and condensing at higher temperatures. This may be of prime importance in aircraft, rocket or missile use. The advantages of being able to use a high condensing temperature are important where a relatively poor heat sink is available, such as an air-cooled condenser which must reject heat to atmospheric air or a condenser which radiates heat to the atmosphere or space. As compared with a steam system, the optimum mercury condenser is approximately one-third the size of an optimum steam condenser, and where heat must be rejected by radiation, the difference would be even greater as the condenser size becomes a function of the fourth power rather than the first power of the condenser temperature. Generally, the mercury cycle is advantageous where a lightweight portable power plant is essential, in that higher cycle efficiencies are obtainable at comparable temperatures, better heat transfer characteristics are obtainable, performance potentials are higher in that the mercury cycles are not limited by pressure limitations but only boiler temperatures, a condenser of smaller size and weight may be used, and higher turbine efficiencies are attainable.

An object of the invention is to provide an improved power plant for operation under the Rankine cycle which obtains increased efficiency and which is well adapted to use as a portable plant obtaining increased power output per pound of equipment weight.

Another object of the invention is to provide an improved power plant which is especially well adapted to utilize the features of the mercury vapor cycle.

Another object of the invention is to provide a closed cycle power plant wherein increased overall thermal efficiency is attainable and heat losses are maintained at a minimum.

A further object of the invention is the provision of a power plant which operates under the Rankine cycle having improved flow systems for the engine, the condenser and the combustor-boiler unit for the power plant.

Another object of the invention is to provide an improved power plant employing a mercury vapor turbine with improved flow systems for the turbine and for the condenser.

Other objects and advantages will become more apparent with the teachings of the principles of the invention in connection with the disclosure of the preferred embodiments thereof in the specification, claims and drawings, in which:

FIGURE 2 is an elevational view, partially in section, of a power plant embodying principles of the invention;

As shown on the drawings:

FIGURE 1 illustrates a power plant 10 which is portable in character and is mounted on a stand 12. The power plant may be utilized for its portable advantages in different locations, and may be used in such embodiments as for driving generators in aircraft or airborne missiles or rockets.

Figure 1:
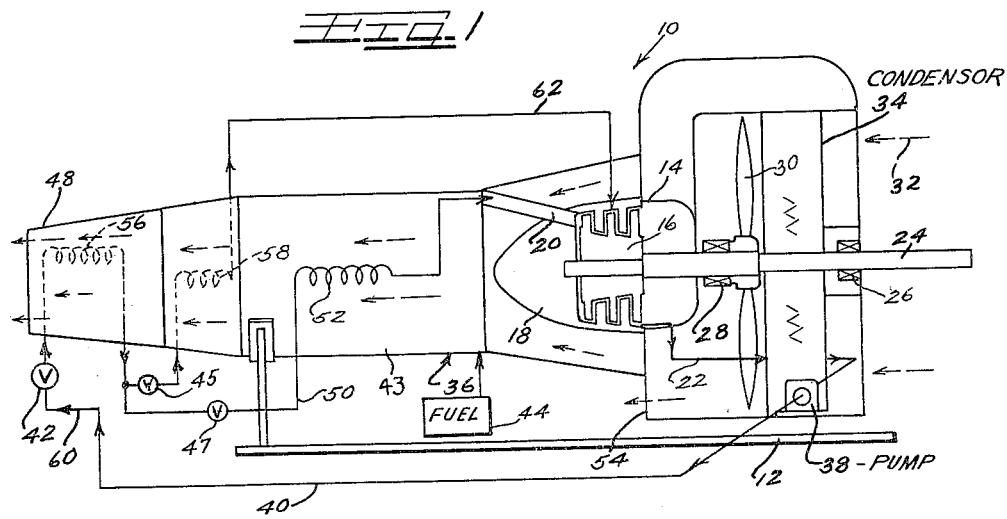
FIGURE 1 is a view, shown partially in schematic form, of a portable power plant embodying the principles of the present invention.

The power plant operates under the principles of a Rankine cycle. For purposes of illustrating the preferred embodiment, the plant is shown as having a turbine 14. It will be understood, however, that in some circumstances, certain advantages of the invention may be utilized in a reciprocating Rankine cycle engine. Also, the turbine 14 is designed to operate under a mercury vapor cycle. The principles of the invention are not limited to use with the mercury vapor and other types of working fluid may be employed. However, inasmuch as certain features of the invention are designed primarily to take advantage of the inherent advantages of a mercury vapor cycle, and for purposes of the present description, reference will be made to the power plants of the invention as utilizing mercury as an operating or working fluid.

The mercury turbine 14 has a rotor 16 which rotates in a housing 18 and is provided with the usual rotary and stationary blades to drive the rotor in rotation as heated mercury vapor is directed through the turbine. The turbine is provided with an inlet line 20 and an exhaust line, shown diagrammatically at 22. The rotor 16 is mounted on a power shaft 24 which is supported in suitable bearings, such as 26 and 28.

Mounted on the power shaft 24 is a fan 30 which draws air in the direction of the arrows 32 to move the air to a condenser at 34 and back through a housing enclosure 36. The housing 36 is generally tubular in nature to provide a flow path extending axially through the entire housing 36.

At the head end of the housing is the condenser 34 which acts as a heat exchange unit to condense the mercury vapor leaving the turbine. The condensed mercury vapor is pumped from the condenser by a pump 38 through a line 40 to flow through a combustor section 43 of the housing 36.

The combustor unit 43 heats the condensed mercury liquid to transform it to mercury vapor from return back to the turbine 14. The combustor is supplied with fuel from a fuel supply unit 44 and preheated air from the condenser 34. The quantity of air flowing through the condenser is in excess of heat which is required for combustion and so the excess air is by-passed and exhausted to the atmosphere at 54. The combustor unit is adapted to operation with various types of fuel. In aircraft, where weight is a factor, chemical fuels may be employed. However, the heat source may be of a chemical, nuclear or solar type. For continued operation, the power plant requires only a heat source of the type mentioned and a supply of cooling air. The condensed high pressure liquid flows through the line 40 and is heated to boiling temperature by the higher temperature combustion gases in the preheat section 56 of the heat exchanger 48. The flow leaving the preheater is divided with the flow and pressures through the two lines controlled by valves 45 and 47. The line containing the valve 45 leads through the low pressure boiling section 58 of the heat exchanger and through line 62 to connect to an intermediate stage in the mercury turbine 14. The line containing the valve 47 leads through the high pressure boiling section 52 of the heat exchanger and then connects by line 20 to the first stage inlet of the turbine 14.

The heat exchange unit 52 is located in the combustion section 43 of the housing 36 to cool the walls of the combustion chamber 43 and thus allow high combustion temperatures. The low pressure boiler 58 and the preheat section 56 are located in successively lower temperature areas and serve to reduce the exhaust temperature of the combustion products. By utilizing this otherwise waste heat they provide high thermal conversion efficiencies.

In FIGURE 2, a form of power plant utilizing engines operating on Rankine and Brayton cycles is illustrated. A turbine 70 is mounted on a power shaft 72 ahead of an air compressor 74. The turbine 70 has a mercury vapor inlet line 78 leading into the first stage of the turbine rotor 76.

The air compressor 74 is provided with an air inlet passage 80 and includes a rotor 84 which compresses the air and delivers it rearwardly through the duct 86 and through heat exchanger tubes 88 upon which the mercury vapor is condensed and cooled.

The expanded mercury vapor from the turbine is delivered through the housing 90 back to the condenser where it is condensed. After condensation, it is removed by a mercury pump 92, and delivered under pressure to a boiler which is not shown but which may be either a nuclear, solar or chemically heated boiler.

Rearwardly of the condenser is a combustion chamber 94 which receives heated air from the condenser. The air is utilized to support combustion of fuel delivered by burner nozzles 96 and 98. The burning gases may be utilized to drive an air or gas turbine 100 and after being discharged from the turbine 100 pass rearwardly to a jet thrust chamber 102 providing thrust for further utilization of the heat of the air and combustion products.

Figure 3:
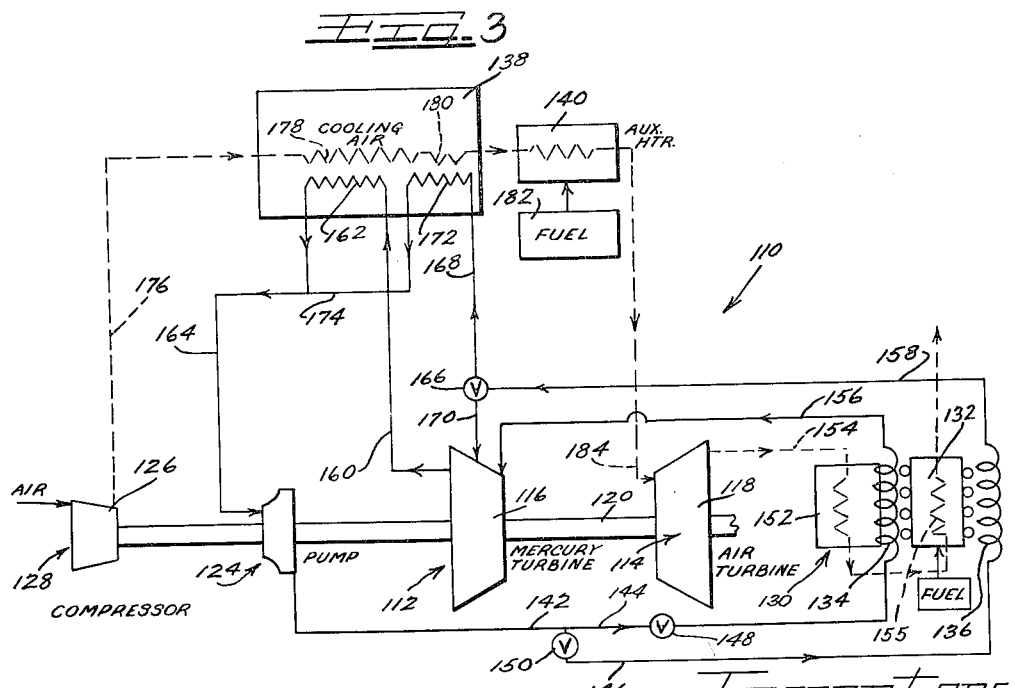
FIGURE 3 is a diagrammatic illustration of a power plant system employing a mercury turbine and an air turbine in accordance with the present invention.

The power plant of FIGURE 3, shown as a closed cycle entity at 110, operates in accordance with the Rankine cycle and utilizes both a mercury turbine 112 and an air turbine 114. The turbines are provided with rotors 116 and 118, respectively, mounted on a power shaft 120. The common power shaft 120 also carries a rotor 126 of an air compressor 128.

In combination with the other elements of the power plant is a heat transfer unit 130 including a boiler-combustor 132. Within the heat transfer unit is a high pressure boiler 134 and a low pressure boiler 136. The power plant also includes a mercury condenser 138. Also included may be an auxiliary heater 140.

The closed cycle for the mercury which is the working or operating fluid for operating the mercury turbine 112, may be followed by starting with liquid mercury line 164. The liquid mercury flows from the condenser 138 to the mercury pump 124 where it is raised to a high pressure. The liquid mercury line splits to deliver a portion through a line 144 and a portion through line 146, the pressures and flows being controlled respectively by valves 148 and 150. Line 144 leads to the high pressure and high temperature heat exchange unit 134 of the unit 130. Heat may also be contributed in the unit 130 to the high temperature section 134 and 136 of the boiler by heat exchange units 152 and 155 by utilizing the heated exhaust air from the air turbine 114 through line 154. The heated mercury vapor from 134 is delivered through a line 156 to the high pressure stage of the mercury turbine 112.

The mercury liquid which flows through line 146 passes through the low pressure section 136 of the combustion boiler 132 and is delivered through a line 158 to an intermediate stage of the rotor 116 of the mercury turbine 112. The mercury vapor, delivered to the turbine through lines 156 and 158, flows from the turbine through an exhaust line 160 which connects to a heat exchange 162 in the mercury condenser. The condensed mercury liquid is pumped out of the condenser and pressurized by the pump 124 through a line 164, thus completing the cycle.

The line 158, leading from the low pressure section 136 of the boiler, contains a control valve 166 for deviating the flow through a branch line 168. Valve 166 operates to direct mercury vapor through intermediate line 170 to the turbine or through the branch line 168. The branch line 168 directs the mercury vapor through a condenser heat exchange coil 172 for heating the air for the air turbine 114. After leaving the heat exchange coil 172, the condensed mercury vapor flows through line 174 to join the flow in line 164 leading to the intake of the mercury pump 124.

The circuit for the air includes an air line 176 leaving from the discharge of the air compressor 128. The air flows through the mercury condenser to condense the mercury vapor and remove heat therefrom. The air flowing from cooling passages 178 in the mercury condenser where it is heated to passages 180 where it receives heat from the mercury in the heat exchange coil 172. The air at this point may be sufficiently heated to operate the air turbine or an auxiliary heater 140 supplied with fuel from a fuel supply 182 may add additional heat to the air. The air then flows down through a line 184 to drive the air turbine. The exhaust air from the turbine is collected by line 154 in the manner before described.

Figure 4:
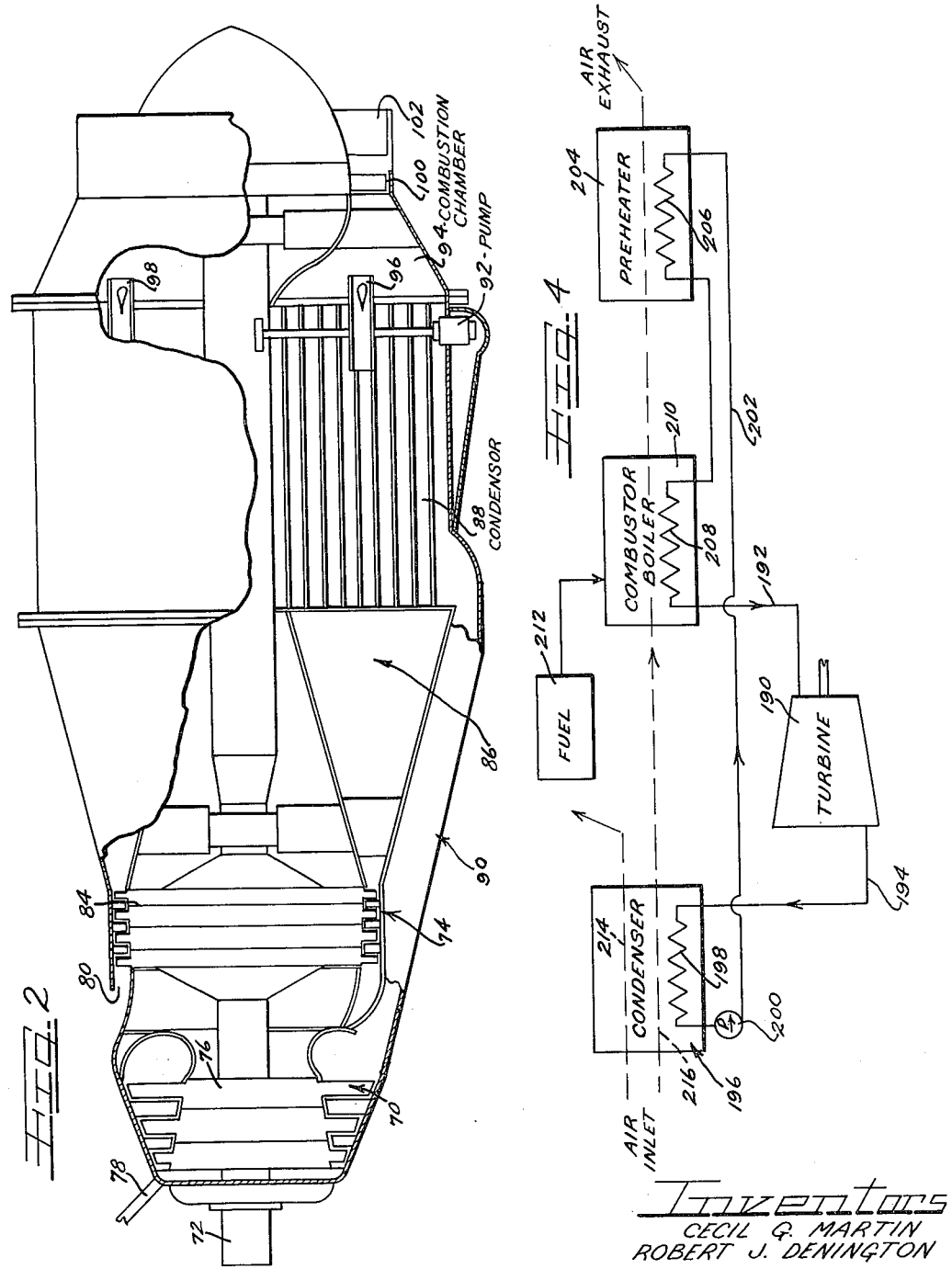
FIGURE 4 is a diagrammatic view of a power plant flow system.

In the arrangement of FIGURE 4, the elements are similar to the elements of the power plants in the previously described figures, but will receive new numbers for ease of description. The turbine 190 has a mercury vapor intake line 192 and an exhaust line 194. Mercury flows through the exhaust line and through a mercury condenser 196 where it passes through a condensing coil 198 to be drawn from the condenser by a feed pump 200. The feed pump pressurizes the liquid mercury and it flows through a delivery line 202 and through a mercury preheater 204 having a mercury coil 206, and into the boiler section 208.

Boiling mercury flowing through a heat exchanger 208 around the combustor serves to cool the combustor walls allowing the combustor to operate with higher gas temperatures which in turn produces higher thermal conversion efficiencies.

The path of flow of air, as guided through the elements, is shown by the broken lines. Line 214 indicates a portion of air which passes through the mercury condenser to be discharged to the atmosphere. The other portion 216 of air which flows through the condenser is directed by suitable conduits to flow first through the combustor boiler 210 providing preheated air for supporting combustion. In the combustion process, the air is heated to a higher temperature. The air is then cooled by contributing most of its heat to the mercury in the coil 208 and it next flows through the mercury preheater where additional heat is removed from the air.

The heat picked up by the air in the condenser is not wasted but utilized to provide preheated air for combustion increasing the thermal conversion efficiency.

Figure 5:
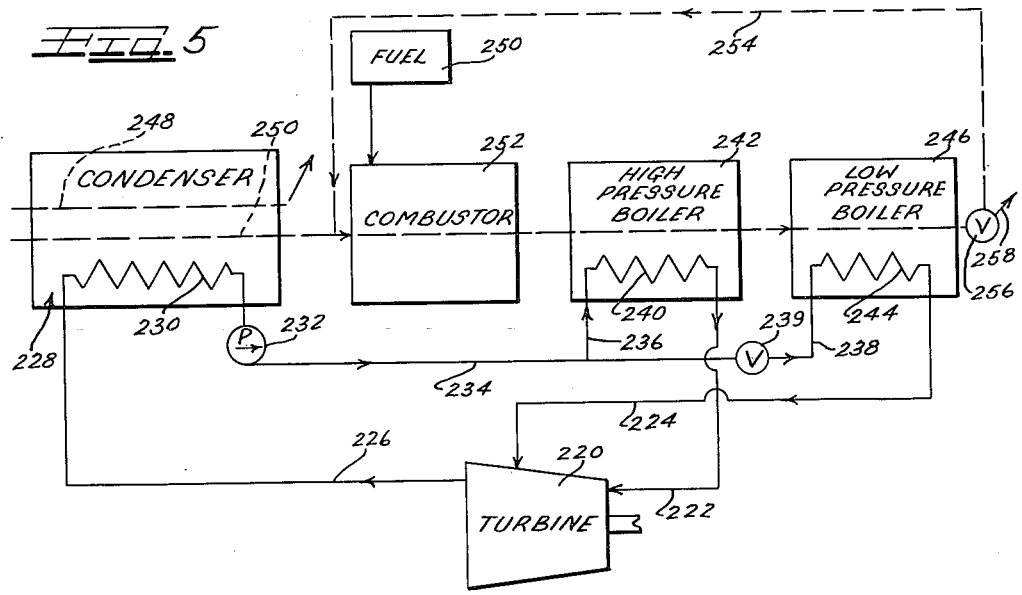
FIGURE 5 is a diagrammatic view of a power plant flow system.

In the arrangement of FIGURE 5, a turbine 220 has a first stage inlet line 222 and an intermediate stage inlet line 224. The mercury expands within the turbine and flows out through an exhaust line 226. From the exhaust line 226 the mercury vapor passes through a mercury condenser 228 by flowing through a condenser coil 230 and the liquid mercury is removed from the condenser by a feed pump 232. The feed pump delivers high pressure mercury to a line 234 which has branch lines 236 and 238. The mercury which flows through branch line 236 passes through a coil 240 in a high pressure boiler 242 and the mercury which flows through a regulator valve 239 in the branch line 238, flows through a coil 244 in a low pressure boiler 246. The vaporized mercury from the high pressure boiler is delivered to the intake high pressure stage line 222 and the mercury vapor from the lower pressure boiler is delivered to the turbine through the intermediate stage line 224.

In the double-boiler arrangement of FIGURE 5, a portion of the air indicated by the broken line 248 flows through the mercury condenser 228 and is discharged into the air and a portion, as indicated by the broken line 250, flows into a combustor 252. The combustor is supplied with fuel from a fuel source 254 and the air, as indicated by broken line 250, is utilized to support combustion and mix with the burning gases to flow into the high pressure boiler and heat the mercury in the coil 240. After losing some of their heat in the high pressure boiler, the products of combustion flow through the low pressure boiler to heat the mercury in the coil 244.

The heated gases leaving the low pressure boiler contain some of the air which originated at the mercury condenser and this air contains heat and oxygen. To utilize both the heat and oxygen, a portion may be by-passed through a line 254 back to the inlet of the combustor and recycled through the combustor and boilers. This flow is controlled by a splitting valve 256 with the remainder of the heated gases being discharged through line 258 to the atmosphere.

Figure 6:
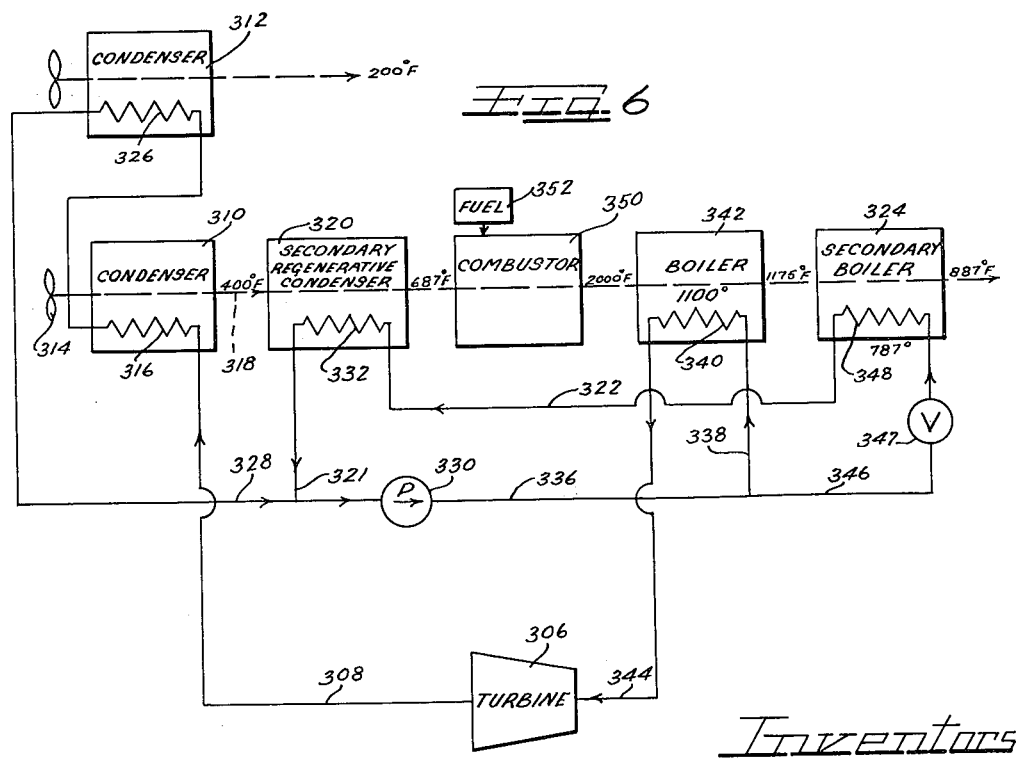
FIGURE 6 is a diagrammatic view of a power plant flow system and associated mechanism illustrating features of the invention.

In FIGURE 6, a dual section mercury condenser unit is employed with mercury vapor whch leaves a turbine 306 through an exhaust line 308 flowing through condenser sections 310 and 312. The condensers are of the air-cooled type, and air is drawn by a fan 314 through the first condenser 310 to flow over condensing coil 316 through a path indicated by the broken line 318. This accomplishes a partial condensation of the mercury vapor and the air then flows through a secondary higher pressure and temperature condenser 320 which serves as a heat exchange unit to further heat the air with the mercury flowing through a line 322 from the secondary boiler 324. This is essentially a regenerative system using a boiling and condensing heat transfer fluid.

The partially condensed mercury vapor enters the condenser 312 and flows through a coil 326 and the liquid flows through a line 328 into the boiler feed pump 330. This pump also collects condensed mercury liquid from the line 322 through the coil 332 from the secondary condenser 320.

From the pump 330 the high pressure liquid mercury is forced through a line 336 and primarily flows through a line 338 through a coil 340 in a primary boiler 342. The mercury vapor formed in the boiler 342 is delivered to the turbine through an intake line 344. The liquid mercury which does not flow through line 338, flows through a line 346 up into a coil 348 of the secondary boiler 324. A valve 347 apportions flow through lines 338 and 346. In the secondary boiler 324, exhaust air from the primary boiler 342, yields additional heat to the boiling mercury in the coil 348. This mercury is passed down to the coil 323 of the secondary condenser to preheat the air before it enters a combustor 350. The combustor is in the air flow circuit with the air leaving the secondary condenser 320, passing through the combustor 350, the boiler 342 and then through the secondary boiler 324. The combustor is supplied with fuel through a fuel source 352.

As an example of temperatures which the working fluid and the air take on in passing through the various stages of their systems, the condenser section 312 may exhaust air at 200° F. The condenser section 310 will heat the air to a temperature of 400° F. and in the secondary regenerative condenser this air will be heated by the mercury to a temperature of 687° F. In the combustor, the fuel is burned in the air and the combustion products will leave the combustor at a temperature of 2000° F. In the boiler, the mercury vapor will be heated to a temperature of 1100° F. and the air will give up its heat dropping to a temperature of 1175° F. The heat from this air is utilized in the secondary boiler to contribute heat to the mercury in the coil 348 and the temperature of the air will drop to 887° F.

In each of the arrangements of the system, the heat of the air is utilized to a full extent, thus attaining economy of operation and improved performance. The flow systems for the air and mercury are so arranged that optimum performance is attained, and it will be seen that we have provided an improved power plant which meets the objectives and advantages hereinbefore set forth.

The embodiments of the invention provide an improved portable power plant unit and system for output in a wide power range which operates with only a supply of fuel or heat and a supply of air.

We have, in the drawings and specification presented a detailed disclosure of the preferred embodiments of our invention, and it is to be understood that we do not intend to limit the invention to the specific form shown, but intend to cover all modifications, changes and alternative constructions and methods falling within the scope of the principles taught by our invention.

We claim as our invention:

1. A vapor and gas cycle power plant comprising in combination a vapor cycle engine having an intake and an exhaust for a first operating fluid, a condenser connected to said exhaust to receive said operating fluid from the exhaust of said vapor engine, a boiler feed pump connected to receive liquid from said condenser, a boiler connected to receive liquid from said pump and connected to deliver vapor to the engine intake, means for delivering a second operating fluid to the condenser for condensing the first operating fluid, a second gas cycle engine connected to receive the second operating fluid from the condenser for driving the second engine, a heat exchanger positioned between the condenser and the second engine for additionally heating said second operating fluid, a secondary boiler, and a bypass line connected to lead a portion of said first operating fluid to said secondary boiler and through said heat exchanger to said pump whereby said first fluid is utilized to heat said second fluid for operating said second engine.

2. A power plant unit comprising in combination a mercury vapor turbine having an intake and an exhaust, a mercury condenser connected to receive mercury vapor from the turbine exhaust, a mercury boiler feed pump connected to receive liquid mercury from the mercury condenser, a boiler connected to receive liquid mercury from the pump, a mercury vapor delivery line connected between the boiler and the turbine intake, an air compressor connected to deliver cooling air to said mercury condenser, an air turbine, an air turbine supply line connected between the air turbine and the condenser to deliver pressurized cooling air from the mercury condenser to operate the turbine, a heat exchanger interposed in said air turbine supply line, a mercury by-pass line connected to said delivery line and to said heat exchanger, and a control valve means for said by-pass line so that a portion of the flow of mercury through said delivery line can be by-passed to said heat exchanger to increase the temperature of air flowing to said air turbine.

References Cited in the file of this patent

UNITED STATES PATENTS

| | | |
|---|---|---|
| 250,586 | Selfe | Dec. 6, 1881 |
| 1,804,694 | Jones | May 12, 1931 |
| 2,035,726 | Sheldon | Mar. 31, 1936 |
| 2,086,781 | Rosencrants | July 13, 1937 |
| 2,452,581 | Lehmann | Nov. 2, 1948 |
| 2,466,723 | Mercier et al. | Apr. 12, 1949 |
| 2,568,787 | Bosch | Sept. 25, 1951 |
| 2,607,192 | Wood et al. | Aug. 19, 1952 |
| 2,613,495 | Mercier et al. | Oct. 14, 1952 |
| 2,717,491 | Barr | Sept. 13, 1955 |

FOREIGN PATENTS

| | | |
|---|---|---|
| 314,100 | Switzerland | July 14, 1956 |